United States Patent Office 2,897,222
Patented July 28, 1959

2,897,222
ALLYL ETHER-SILICONE COPOLYMER

Donald L. Bailey, Snyder, N.Y., assignor to Union Carbide Corporation, a corporation of New York No Drawing. Application December 17, 1957
Serial No. 703,253

1 Claim. (Cl. 260—448.2)

This invention relates to a novel organosilicon composition. More particularly, the invention contemplates the provision of a new composition of matter in the form of the linear allyl ether-silicone copolymer represented by the formula:

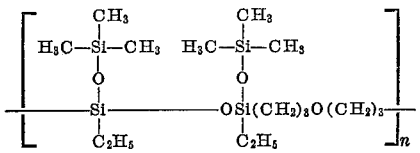

wherein $(n)$ represents a simple multiplier.

The invention is based on my discovery that the foregoing copolymeric siloxane structure can be synthesized by the thermal addition of the silanic hydrogen-bonded siloxane bis(trimethylsiloxy) bis(ethylhydrogensiloxane) [Me₃SiO(EtSiHO)₂SiMe₃] to diallyl ether $$[(CH_2=CHCH_2)_2O]$$

in the presence of a platinum catalyst. In essence, the synthesis involves the formation of a reaction mixture comprising the silanic hydrogen-bonded siloxane, diallyl ether, and a small amount of a platinum catalyst, followed by heating of the reaction mixture to cause the components to react under influence of the platinum catalyst to effect decomposition of the silanic hydrogen bonds of the siloxane and addition of the resulting silicon-hydrogen free radicals to respective carbon atoms of the carbon to carbon multiple bond of the diallyl ether, with the production of the desired linear copolymer as an adduct of the component reactants.

The platinum catalyst used in promoting addition of the Si—H siloxane to the diallyl ether, is preferably employed in finely-divided form, either alone, or in combination with an inert support such as charcoal, and the like, or in the form of a multicomponent or heterogeneous catalyst consisting of platinum deposited on the gamma-allotrope of alumina (platinum-on-gamma-alumina).

It is found that the relative concentration of platinum employed for catalyzing the addition reaction is not overly critical, but rather, concentrations of the elemental metal ranging from 0.001 percent to about 5 percent by weight of the reactants can be employed and satisfactory results are obtained. In actual practice employing the metal in the form of the heterogeneous catalyst, platinum-on-gamma-alumina, I have found that concentrations of the order of one to two percent by weight of the heterogeneous substance, containing one to two percent by weight of elemental platinum, function admirably for the purpose intended.

In general, the reaction time and temperature of reaction for the production of the addition copolymer are also relatively non-critical, and the reaction can be brought to completion by heating the reactants at temperatures within the range 80–180° C. for periods up to twelve hours. In actual practice I prefer to conduct the reaction at a temperature within the range 150–160° C. It is relatively essential, however, to effect constant stirring or agitation of the reaction mixture throughout the time of reaction in order to establish and maintain uniform dispersion of the solid catalyst within the liquid reaction phase.

The copolymer of the invention is useful as a silicone oil and may be employed, also, to introduce the functional ether groups into siloxanes by conventional equilibration techniques. The presence of the relatively long hydrocarbon chains within the polymer render it useful as a modifier for other silicone oils and polymers, contributing greater compatibility with organic oils or polymers.

It is believed that the invention may be best understood by reference to the following specific example describing the foregoing principles and procedures as applied to the production of the novel copolymer of the invention:

EXAMPLE

*Preparation of a linear allyl ether-silicone copolymer by addition of bis(trimethylsiloxy)bis(ethylhydrogensiloxane)* [Me₃SiO.(EtSiHO)₂SiMe₃] *to diallyl ether*

Into a 500 cubic centimeter flask equipped with stirrer and reflux condenser, there were charged 62 grams (0.2 mole) of Me₃SiO(EtSiHO)₂SiMe₃, 19.6 grams (0.2 mole) of (CH₂=CHCH₂)₂O, and 0.8 gram of one percent platinum-on-gamma-alumina catalyst. The mixture was heated with stirring for twelve hours at 150–160° C. After cooling to room temperature and removal of the catalyst by filtration, there were collected 74.5 grams of a viscous oil. This material was heated to 200° C. at 0.5 mm. to remove low boiling products. The residual material was a linear polymer weighing 62.5 grams and having a viscosity of 110 centistokes at 25° C. The polymer yielded the following analytical data:

|   | Percent Si | Hydrolyzable Hydrogen, cc./g. |
|---|---|---|
| Found | 26.0 | 1.4 |
| Theoretical | 27.4 | 0 |

Having thus described the subject matter of my invention, what it is desired to secure by Letters Patent is:

A linear allyl ether-silicone copolymer represented by the formula:

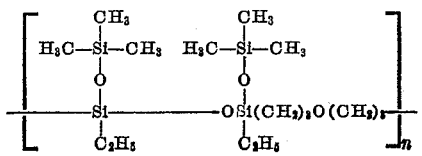

wherein $(n)$ represents a simple multiplier.

No references cited.